United States Patent Office 2,738,804
Patented Mar. 20, 1956

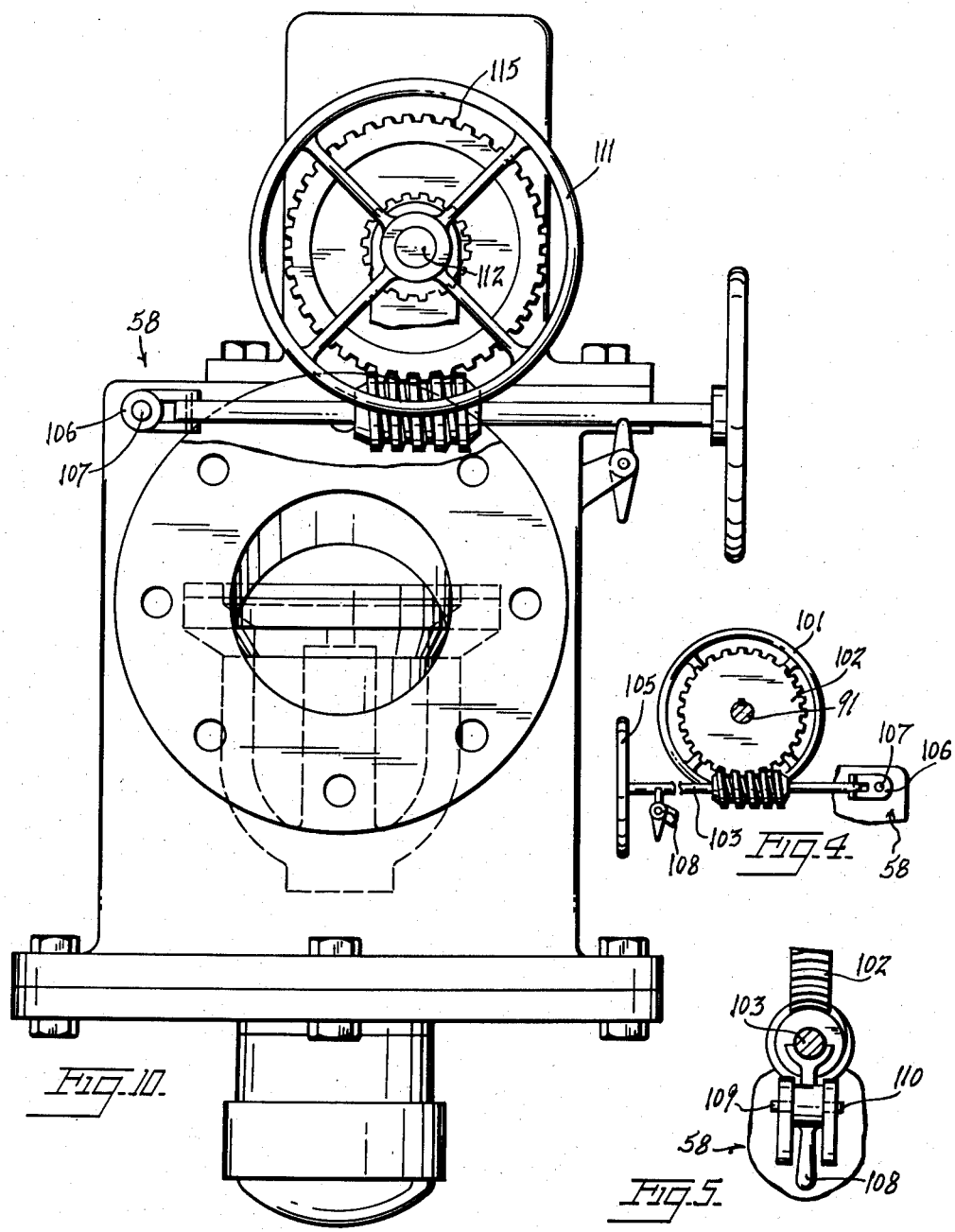

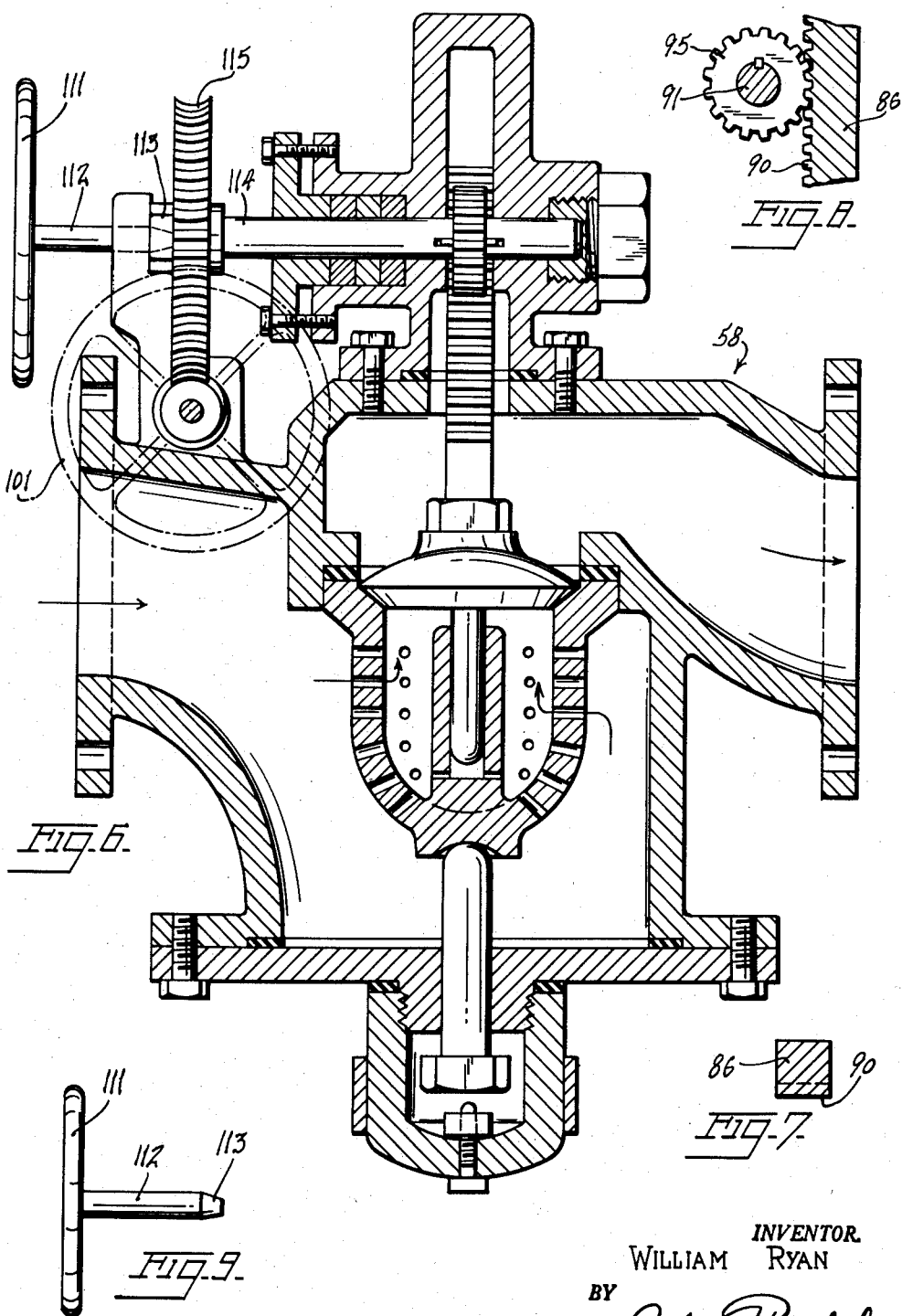

2,738,804

STRAINER VALVE

William Ryan, New York, N. Y., assignor to Commissioner of Welfare of the City of New York Application December 2, 1953, Serial No. 395,754

2 Claims. (Cl. 137—549)

This invention relates to new and useful improvements in strainer valves.

More particularly, the present invention proposes the construction of an improved strainer valve having a valve seat which can easily be removed for grinding.

Another object of the present invention proposes forming the valve seat as a part of the strainer so that it can be checked at the same time the strainer is inspected or cleaned.

Still further the present invention proposes arranging the strainer between the valve ports so that both the passage between these ports is blocked and the strainer is closed when the valve disc is engaging the valve seat on the strainer.

As further object, the present invention proposes constructing the strainer and the valve disc so that the valve disc is guided to proper engagement with the valve seat to tightly close the valve.

The present invention further proposes constructing the valve stem so that it may be operated at right angles to it from outside the casing of the valve without loss of efficiency or any leakage.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a detail view showing a fragment of Fig. 2 partly in section and at right angles thereto.

Fig. 4 is an end view of the worm and gear-wheel shown in Fig. 2 with a latch.

Fig. 5 is a detail view of the latch.

Fig. 6 is a view similar to Fig. 2, but illustrating another modification.

Fig. 7 is a top plan view of the valve stem shown in Fig. 6.

Fig. 8 is a side elevational view of a fragment of the valve stem with rack teeth and pinion shown in Fig. 6.

Fig. 9 is a side view of the removable hand-wheel shaft and hand-wheel shown in Fig. 6 as removed from the valve.

Fig. 10 is an elevational view of the valve shown in Fig. 6.

Figure 1:
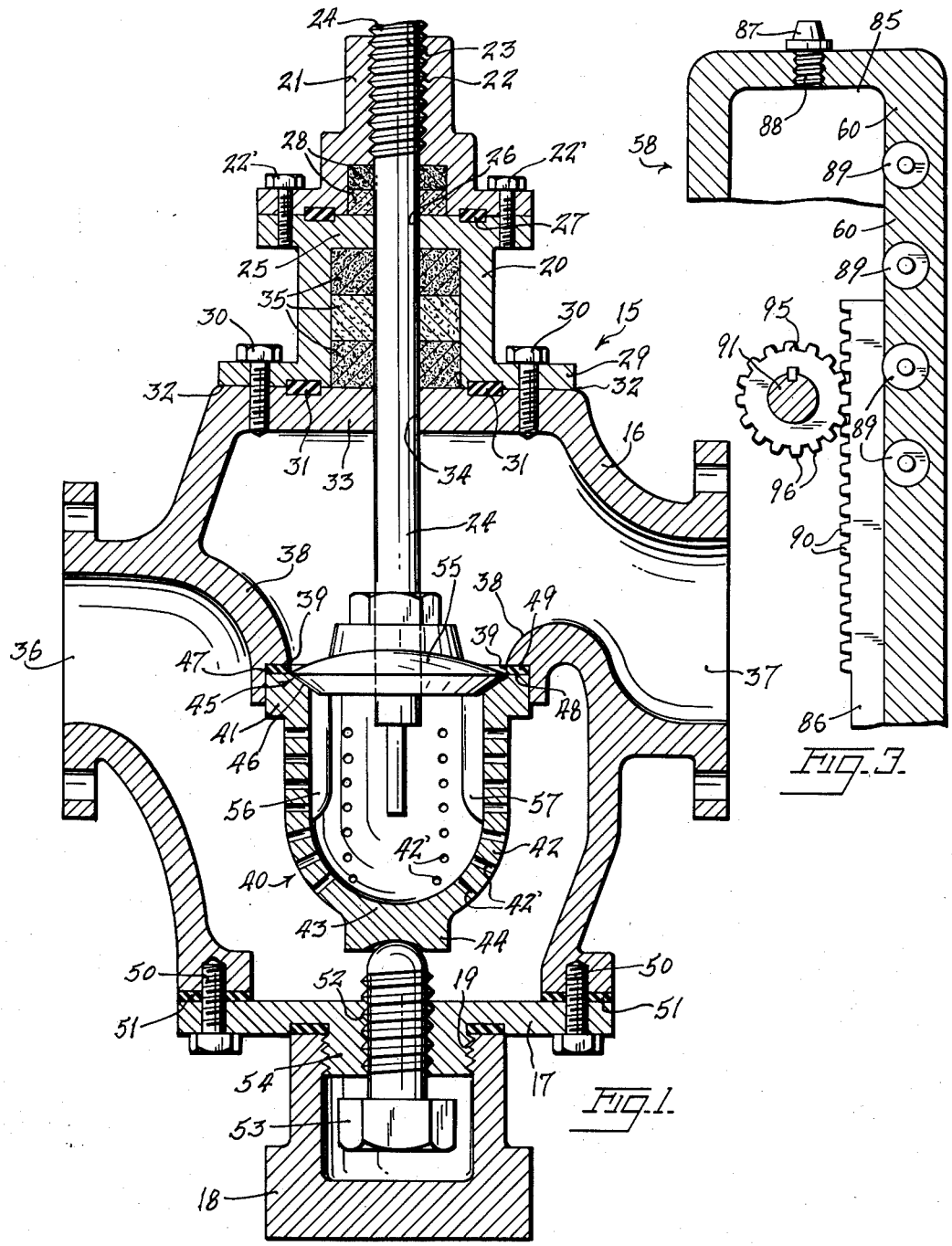
Fig. 1 is a vertical sectional view illustrating the valve of the present invention.
Figure 2:
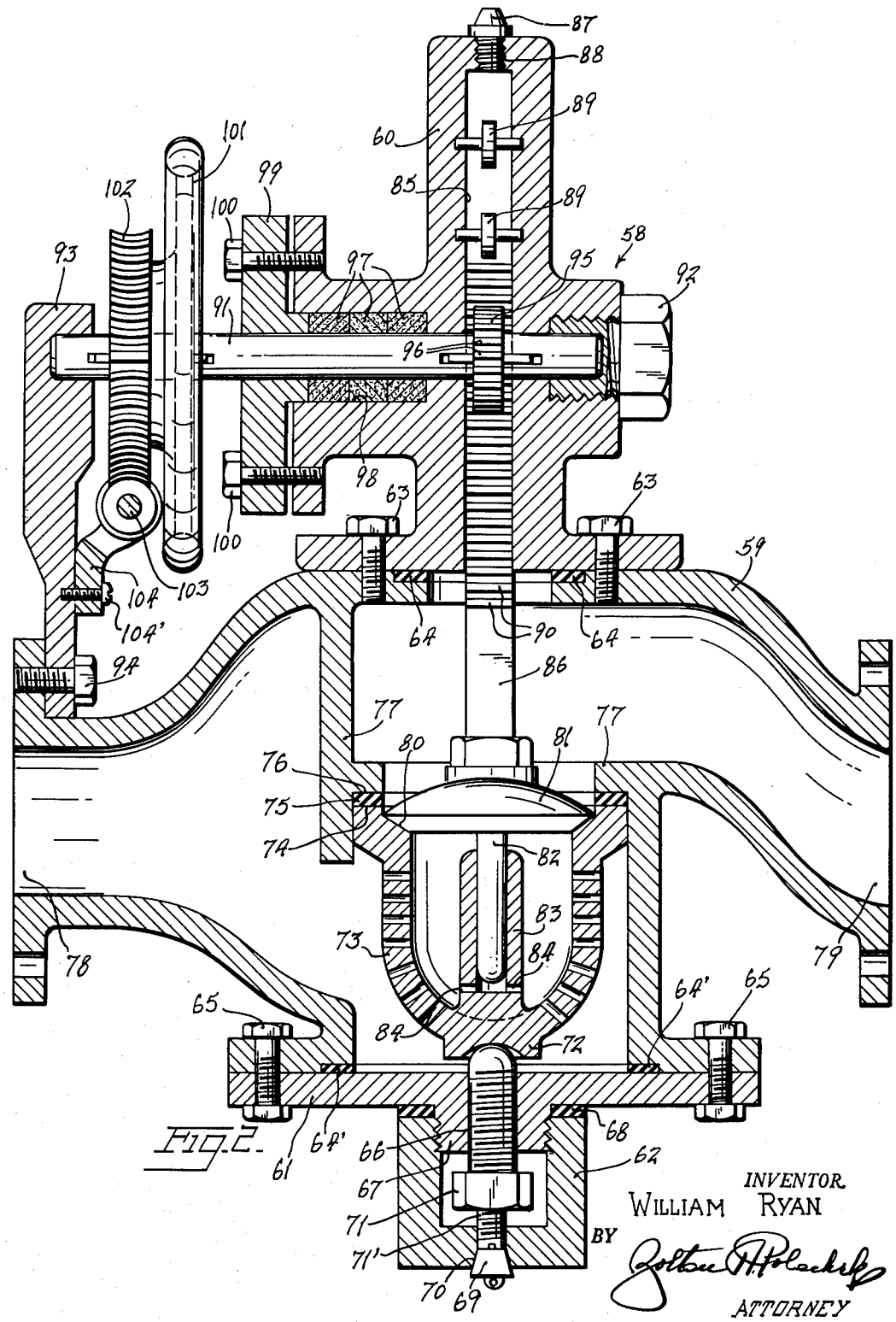
Fig. 2 is a view similar to Fig. 1, but illustrating a modification of the present invention.

The strainer valve, in accordance with the first form of the invention illustrated in Fig. 1, has a casing 15 comprised of a body portion 16, a lower plate 17, a lower cap 18 connected to plate 17 by threads 19, a stem packing housing 20 and an upper cap portion 21. The upper cap portion 21 is provided with a central threaded opening 22 to receive like threads 23 on a valve stem 24.

The stem packing housing 20 has a top closed end 25 with a central valve stem opening 26 through it. This end 25 is fastened to upper cap portion 21 as by screws 22 and an annular gasket 27 is contained between the housing and cap portions of the casing. Small packing rings 28 encircle the valve stem inside the cap and are held in the cap by the end 25 of the stem packing housing 20.

Lower end 29 of the stem packing housing 20 is fastened to the body portion 16 of the casing as by screws 30 and an annular gasket 31 between the joint 32 insures a fluid tight fit. The upper wall 33 of the body portion 16 is provided with a valve stem opening 34. Larger packing rings 35 around the valve stem 24 are held in the stem packing housing 20 by the upper wall 33 of the casing's body portion 16.

Casing 16 is provided with inlet and outlet ports 36 and 37 respectively in its body portion 16 and a partition 38 is interposed between the ports. The partition 38 in the body portion 16 of the casing has an opening 39 through it for connecting the ports. A strainer 40, having an open end 41, is removably fastened in the opening 39, as will now be described.

Strainer 40 preferably is hollow cup shaped with perforated sides 42, the perforations 42' being spaced apart and all around the strainer cup, and a closed end 43 opposite the open end 41. A stud bearing surface 44 is located on the outside of the closed end 43.

The open end 41 has an open end edge 45 and a valve seat 46 is ground or otherwise formed on its inner portion. A flaring recess 47 in one face of the partition 38 between the valve ports 36 and 37 is formed of a depth to receive the outer portion 48 of the open end edge 45 on the strainer cups 40, this outer portion 48 abutting a ring gasket 49 when held in the recess.

Lower plate 17 of the casing is fastened to the body portion 16 as by screws 50 with a ring gasket 51 between. The plate 17 has a central threaded screw or stud opening 52 through which a strainer cup holding screw or stud 53 extends. Screw 53 bears against the bearing surface 44 on the closed end 43 of the strainer cup 40 to hold the strainer cup removably in the partition opening 39.

A raised central portion 54 of the lower plate 17 around its screw or stud opening 52 is threaded to receive the threaded lower cap 18 which covers the stud or screw 53.

Valve stem 24 extending into casing 15 has a valve closing disc 55 connected with it and movable toward and away from the seat 46 on the strainer cup 40 when the stem is turned, the threads 23 on the stem being engaged in those of threaded opening 22 in the casing's upper cap portion 21.

Connected with and extending beyond the valve closing disc 55 are depending guide members 56 and 57 which are slidable inside the strainer cup 40 against its sides to guide the valve closing disc onto the valve seat.

In the modification shown Figs. 2-5 inclusive, the strainer valve has a casing 58 with a body portion 59, an upper housing portion 60, a lower plate 61, and a lower cap 62. The upper housing portion 60 is joined to the body portion 59 as by screws 63, with a ring gasket 64 between. The lower plate is provided with a threaded stud or bolt opening 66 and has a threaded hub 67 to which the threaded lower cap 62 is attached, a ring gasket 68 being interposed between the plate 61 and the cap 62. A pipe plug 69 extends into and plugs an opening 70 in the cap 62.

A jamb bolt or stud 71 extends through opening 66 in plate 61 and a jamb screw 71' to lock the bolt in place is provided in the cap opening 70 under the pipe plug 69 and bearing against the head of the bolt or stud 71.

The bolt or stud 71 in turn bears against a bearing surface 72 on the bottom of a perforated strainer cup 73 to force the upper edge 74 of the cup against an annular gasket 75 in recess 76 in a partition 77 in the body portion of the casing 58 between an inlet port 78 and an outlet port 79.

A valve seat 80 is formed on the inner portion of the upper edge of the cup to seat a valve closing disc 81 having a guide rod 82 extending into the cup. A guide member 83 is provided in the cup with drain holes 84 at its base. The guide member is secured to the closed bottom of the cup to slidably receive the guide rod.

The upper housing portion 60 has a valve stem opening 85 slidably to receive valve stem 86. An oiling plug 87 extends through and closes a threaded opening 88 in the upper closed end of the housing 60.

Valve stem 86 is square in cross section (see Fig. 7) and valve stem opening 85 is shaped to hold the valve stem so it may slide up and down but cannot turn therein. Anti-friction rollers 89 are rotatably held in the housing behind the valve stem to make it slide easily.

Valve stem 86 has rack teeth 90 cut on its front face at its upper end and its lower end is connected to the valve closing disc 81. A shaft 91 is rotatably secured to the casing at right angles to the valve stem, one end of the shaft being held in a bearing nut 92 and other end in a shaft support 93 fixed to the casing, as by bolt or screw 94.

A pinion 95 is fixed to the shaft 91 with its teeth 96 meshing with the rack teeth 90 on the valve stem 86 so that the valve stem is slid up and down in the housing opening 85 when the shaft is rotated, the direction depending on the direction in which the shaft is rotated. This moves the disc 81 into and out of engagement with the seat 80 on the strainer cup.

The shaft 91 is encircled by packing rings 97 held in a stuffing box 98 in the housing portion 60 by a gland 99 removably secured to the housing by bolts or screws 100.

A hand-wheel 101 is fixed to the shaft 91 outside the casing for rotating the shaft and operating the valve. Outboard of the hand-wheel on the shaft is a gear-wheel 102 keyed to the shaft. A worm shaft 103 is rotatably secured to the casing being rotatably held in a bracket 104 fixed to the shaft support 93 as by screws 104' (only one of which is shown).

The worm shaft 103 meshes with the gear-wheel so that by rotating the worm shaft the valve can be operated. A second hand wheel 105 (see Fig. 4) is fixed to the worm shaft 103 for rotating this shaft. One end of the worm shaft is rotatably held in a swivel mounting 106 pivotally connected with the casing by pin 107 so that the worm may be moved out of mesh with the gear-wheel. A locking latch 108 is pivotally connected with the casing, having trunnions 109 and 110 (see Fig. 5), to lock the worm shaft when it is in mesh with the gear wheel.

The modification illustrated in Figs. 6—10 inclusive is characterized by a removable hand-wheel 111 fixed to a shaft 112 with a key shaped end 113. The end of the pinion bearing shaft 114 outboard of the worm or gear wheel 115 has a recess adapted to receive this key shape end 113 of the shaft 112.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A valve comprising a casing having inlet and outlet ports, a partition in the casing between the ports, said partition having an opening therein for connecting the ports, a hollow strainer cup having perforated sides and one closed end and one open end edge, said partition having a flaring recess in one face around its opening for receiving the open end edge of the strainer cup, a gasket in the recess, a threaded stud extending through the casing and engageable with the closed end of the cup to hold the outer portion of the open end edge of the cup against the gasket, a valve seat on the inner portion of the open end edge of the cup, a valve closing disc movable toward and from the seat to close the open end of the cup and the opening between the ports in the partition, and a valve stem extending into the casing and connected with the disc from moving the disc into and out of engagement with the seat, said cup having a bearing surface on its closed end for stud abutment, said valve closing disc and said cup having cooperating means for guiding the disc in its movements.

2. A valve comprising a casing having inlet and outlet ports, a partition in the casing between the ports, said partition having an opening therein for connecting the ports, a hollow strainer cup having perforated sides and one closed end and one open end edge, said partition having a flaring recess in one face around its opening for receiving the open end edge of the strainer cup, a gasket in the recess, a threaded stud extending through the casing and engageable with the closed end of the cup to hold the outer portion of the open end edge of the cup against the gasket, a valve seat on the inner portion of the open end edge of the cup, a valve closing disc movable toward and from the seat to close the open end of the cup and the opening between the ports in the partition, and a valve stem extending into the casing and connected with the disc for moving the disc into and out of engagement with the seat, said cup having a bearing surface on its closed end for stud abutment, said valve closing disc having a guide rod extending into the cup and a guide member inside the cup and secured to the closed end of the cup to slidably receive the guide rod.

References Cited in the file of this patent

UNITED STATES PATENTS

| | | |
|---|---|---|
| 157,554 | Stone | Dec. 8, 1874 |
| 227,193 | White | May 4, 1880 |
| 287,005 | Cullingworth | Oct. 23, 1883 |
| 680,209 | Thompson | Aug. 6, 1901 |
| 1,044,623 | Bailey | Nov. 19, 1912 |
| 1,147,702 | Bower | July 27, 1915 |
| 1,989,816 | Crossen | Feb. 21, 1933 |

FOREIGN PATENTS

| | | |
|---|---|---|
| 501,855 | France | Feb. 7, 1920 |
| 22,911 | Austria | Feb. 10, 1906 |